United States Patent [19]
Tinner

[11] Patent Number: 5,318,274
[45] Date of Patent: Jun. 7, 1994

[54] SEALING ARRANGEMENT FOR VALVES
[75] Inventor: Friedrich Tinner, Haag, Switzerland
[73] Assignee: Cetec AG, Sax, Switzerland
[21] Appl. No.: 983,868
[22] PCT Filed: Jun. 10, 1992
[86] PCT No.: PCT/CH92/00111
§ 371 Date: Mar. 5, 1993
§ 102(e) Date: Mar. 5, 1993
[87] PCT Pub. No.: WO93/01437
PCT Pub. Date: Jan. 21, 1993

[30] Foreign Application Priority Data
Jul. 9, 1991 [CH] Switzerland .................. 2040/91
[51] Int. Cl.$^5$ ............................... F16K 1/32
[52] U.S. Cl. ........................ 251/176; 251/186
[58] Field of Search .................... 251/176, 186

[56] References Cited
U.S. PATENT DOCUMENTS
3,069,129 12/1962 Grove ................ 251/176 X
3,199,833 8/1965 Skinner et al. .......... 251/176
4,395,050 7/1983 Wirz .................. 251/176 X Primary Examiner—John C. Fox
Attorney, Agent, or Firm—Watson, Cole, Grindle & Watson

[57] ABSTRACT

In a sealing element for use in particular in high vacuum technology, a moveable closure unit (4) is closed tightly against a fixed outer flange (1) whose sealing surface (2) is preferably conical. The closure unit (4) comprises a hat-shaped outer part (5) with a flat base (8) and a sealing surface (7) around the periphery; and an inner part (6) concentric with, and smaller in diameter than the outer part. Between them are one or more spring elements (10), arranged as segments on a ring, which act as a disk spring; these are supported by the outer and inner edges on the outer (5) and inner (6) parts. The spring elements (10) are mounted at an oblique angle radially towards the base (8) of the outer part (5) in such a way that when the base (8) of the outer part is subjected to pressure, the radial force is produced at the sealing surface (7) of the elastically deformable outer part (5) and its base (8) is pressed inwards. In this position, the closure unit (4) remains in position, even when the force of the plunger (13) exerted against the base (8) of the outer part is removed.

4 Claims, 1 Drawing Sheet

SEALING ARRANGEMENT FOR VALVES

BACKGROUND OF THE INVENTION

The invention relates to a sealing arrangement for valves, gates or flap valves, specifically for the use in the ultra high vacuum technique, having a sealing surface formed at an outer flange and a sealing surface cooperating with same and located at the outer circumference of an axially movable closure unit (valve disk), which includes at least one biassing member becoming active by the axial movement for an increasing of the outer circumference for a pressing of the sealing surfaces onto each other.

In a known sealing arrangement of this kind the two-part closure unit consists of a planar disk having an elastically deformable annular bead at the outer circumference and a ring which is movable in an axial direction, having a smaller diameter and arranged coaxially to the disk and located in the plane of the bead-like rim. A cup spring supported at the outside on the ring and at the inside at the bead-like rim acts as a coupling member between the two parts and can be pressed by means of an axially movable ring from a relaxed position into a completely planar position, in which in order to produce a pressing-on force onto the sealing surfaces it has its largest diameter and attains practically a dead-center position. A safe functioning for an obtaining of an absolutely sealed closure at changing temperatures is not safely ensured by this arrangement.

Therefore, the present invention is directed to providing a sealing arrangement of this kind in which the biassing element producing the pressing-on force is not a coupling member between two parts which are movable relative to each other and which up to reaching the dead-center position continuously move away from each other under the influence of the spring force and need the continuous action of a pressing-on force.

In order to achieve this object the inventive sealing arrangement comprises a cap shaped outer part formed with a planar base, which is elastically deformable and includes at its outer circumference a sealing surface for a cooperation with a further sealing surface of an outer flange, an inner part concentric to the outer part and having a smaller diameter, and biassing members arranged along an annulus which provide the action of a cup spring, or instead thereof also only a cup spring is present. The biassing members, which can be held and supported at the outer part in an annular tee-slot shaped recess are arranged inclined obliquely radially towards the inside against the base of the outer part, while the pressure for the actuating is directed towards the outer part base, with the effect that the elastically deformable outer part base attains an inwardly pressed position without the bracing elements reaching a dead-center position. The elastic deformability of the outer part base is enhanced also specifically in that a radially inwardly extending groove is formed in the integral closure part between the inner part and the base.

An embodiment of the invention will hereinafter be explained more in detail with reference to the drawings.

DETAILED DESCRIPTION OF THE PREFERRED EMBODIMENT

Figure 1:
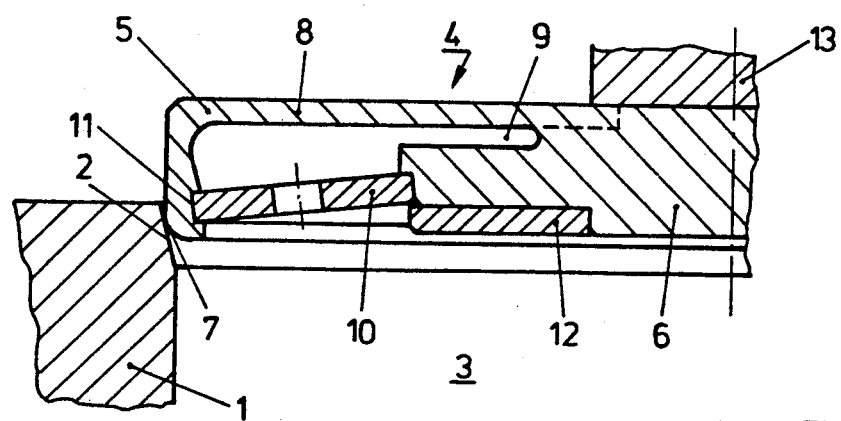
FIG. 1 is a vertical section through the sealing arrangement in an initial position, illustrating one half upto the center line.

A stationary housing or an outer flange 1 includes a preferably conical sealing surface 2 which is located at the upper end of a channel 3 encased by the flange 1. It is now to be sealingly closed by a closure member 4. This closure member is formed by an outer part 5 and an inner part 6 connected integrally thereto. The outer part 5 has a cap or pot shaped form and possesses at the outer circumference a sealing surface 7 for cooperation with the sealing surface 2 at the flange 1 and includes, furthermore, an elastically deformable outer part base 8. The elastic deformability is obtained specifically also in that in case of a integral design, a radially inwards extending recess 9 is formed between the base 8 and the inner part 6. It would be possible, as well, to manufacture the outer part and the inner part separately and to connect them firmly in a suitable way.

Figure 2:
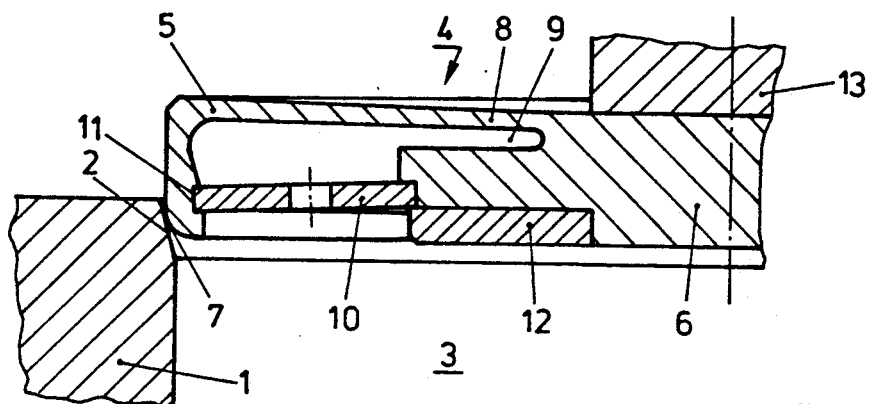
FIG. 2 is a vertical section corresponding to FIG. 1 in an actuated position having an inwards pressed outer part base.
Figure 3:
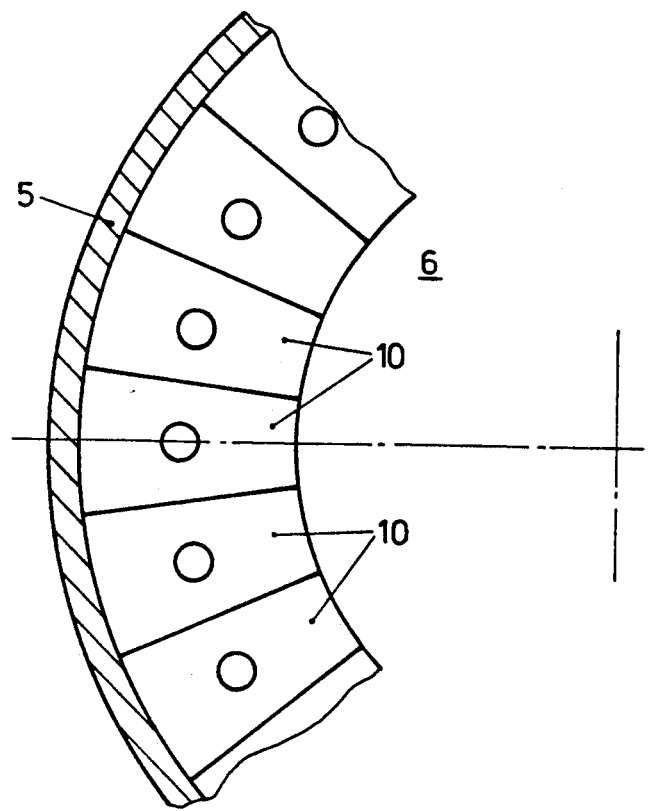
FIG. 3 is a top view of a cut-out of a plurality of biassing members.

A plurality of biassing members 10 which according to FIG. 3 consist of sectors of a circular ring, are located along a circle and provide the effect of a cup spring, are supported by their outer edge in an annular tee-slot recess 11 in the outer part at a distance from the sealing surface 7 and are supported by their inner edge at a lock washer mounted to the inner part 6. The biassing members 10 are arranged to project obliquely inclined from the outer edge radially inwardly towards the base 8 of the outer part, such that upon an axial displacement of the base and the inner part by a pressing of a pressure plunger 13 in axial direction against the outer part base 8, the sealing surfaces 2 and 7 come to lie against each other. The biassing members 10 are not pressed upto the completely horizontal position. FIG. 2 discloses further that the elastically deformable outer part base 8 is pressed inwardly like a membrane.

I claim:

1. A sealing element for use in closing a channel in a housing by sealingly contacting a circumferential inner seating surface provided by the housing, said sealing element comprising:

a body which defines a central axis and includes (1) an elastically deformable, cap-shaped outer part provided by a planar base portion which extends generally perpendicularly to said central axis and a skirt portion which extends generally perpendicularly to said base portion, said skirt portion defining an inner surface and an outer surface that includes a peripheral sealing portion for abutting said seating surface of said housing, and (2) an inner part which is coaxial with said outer part and which defines a peripheral surface that faces said inner surface of said skirt portion of said outer part and lies inwardly thereof, and a plurality of biasing members which extend from said skirt portion of said outer part to said peripheral surface of said inner part, said biasing members extending radially inwardly at an inclined angle towards said base portion of said outer part, such that when said base portion of said outer part is axially pushed along said central axis in a direction towards said inner part, said biasing members will push said skirt portion of said outer part radially outwardly to press said sealing portion thereof against said seating surface of said housing.

2. A sealing element according to claim 1, wherein said inner part provides a radially inwardly directed recess between said peripheral surface and said base portion of said outer part to increase the elastic deformability of said base portion.

3. A sealing element according to claim 1, wherein said outer part and said inner part form a one-piece body.

4. A sealing element according to claim 1, wherein said outer part and said inner part are separate members connected together.

* * * * *